United States Patent
Campo et al.

(10) Patent No.: US 7,241,389 B2
(45) Date of Patent: Jul. 10, 2007

(54) OXIDIZING PROCESSES BY OXYGEN TRANSFER WITHIN A LIQUID MEDIUM IN A REACTOR UNDER PRESSURE

(75) Inventors: Philippe Campo, Montigny le Bretonneux (FR); Michel Muguet, Montigny le Bretonneux (FR); Nadège Berthier, Vauhallan (FR)

(73) Assignee: L'Air Liquide, Société Anonyme A Directoire et Conseil de Surveillance pour l'Etude Et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/451,496

(22) PCT Filed: Dec. 18, 2001

(86) PCT No.: PCT/FR01/04037

§ 371 (c)(1),
(2), (4) Date: Jun. 20, 2003

(87) PCT Pub. No.: WO02/49753

PCT Pub. Date: Jun. 27, 2002

(65) Prior Publication Data

US 2004/0055968 A1 Mar. 25, 2004

(30) Foreign Application Priority Data

Dec. 20, 2000 (FR) .................................. 00 16671

(51) Int. Cl.
*C02F 1/72* (2006.01)
(52) U.S. Cl. .................. 210/739; 210/758; 210/928
(58) Field of Classification Search ................ 210/739, 210/746, 758, 761, 762, 928; 422/185, 110
See application file for complete search history.

(56) References Cited

U.S. PATENT DOCUMENTS

| 3,761,409 A | * | 9/1973 | McCoy et al. .............. 210/761 |
| 4,156,650 A | * | 5/1979 | Garrett ...................... 210/758 |
| 4,229,296 A | * | 10/1980 | Wheaton et al. ............. 210/758 |
| 4,328,175 A | * | 5/1982 | Roeckel et al. .............. 261/91 |

(Continued)

FOREIGN PATENT DOCUMENTS

WO    WO 96 13463    5/1996

(Continued)

OTHER PUBLICATIONS

International Search Report for PCT/FR01/04037.

(Continued)

*Primary Examiner*—Matthew O. Savage
(74) *Attorney, Agent, or Firm*—Christopher J. Cronin

(57) ABSTRACT

Methods for oxidizing a liquid with an oxidization gas in a closed volume reactor. A feed liquid which contains compounds to be oxidized is fed into the closed volume reactor, and a feed gas containing oxygen is fed into the reactor so as to form a gas overhead above the feed liquid. The overhead is later purged at a specific rate so as to ensure a predetermined oxygen partial pressure is maintained in the gas overhead. The value of this partial pressure corresponds to a predetermined, desired rate of oxidation of the compounds contained in the feed liquid.

14 Claims, 1 Drawing Sheet

U.S. PATENT DOCUMENTS

| | | | | |
|---|---|---|---|---|
| 4,384,959 A | * | 5/1983 | Bauer et al. | 210/739 |
| 4,454,077 A | * | 6/1984 | Litz | 261/91 |
| 5,171,405 A | * | 12/1992 | Torregrossa | 162/243 |
| 5,324,439 A | * | 6/1994 | Chen et al. | 210/761 |
| 5,972,226 A | * | 10/1999 | Djafer et al. | 210/762 |

FOREIGN PATENT DOCUMENTS

| | | | |
|---|---|---|---|
| WO | WO 99/04088 | * | 1/1999 |
| WO | WO 99 04088 | | 1/1999 |

OTHER PUBLICATIONS

Lawrence M. et al.: "*A novel gas-liquid stirred tank reactor*", CEP, Nov. 1985, pp. 36-39.

International Search Report for PCT/FR01/04037, Apr. 2002.

* cited by examiner

OXIDIZING PROCESSES BY OXYGEN TRANSFER WITHIN A LIQUID MEDIUM IN A REACTOR UNDER PRESSURE

BACKGROUND

There is a considerable growth in the use of oxygen in many industrial fields, especially in the papermaking field, and in particular in kraft-type paper pulp mills.

This is because not only is the size of plants increasing but applications for oxygen are becoming more numerous; in the papermaking field, mention may be made, for example, of the use of oxygen for delignification, the alkaline extraction stage, the doping of lime kilns, the treatment of effluents, the oxidation of liquors and, more recently, the production of ozone.

Since the requirements for oxygen are growing, it is becoming increasingly common, especially for economic reasons, to produce oxygen on the actual site where it is used, making use to do this of self-production systems, for example of the PSA (Pressure Swing Adsorption) or VSA (Vacuum Swing Adsorption) type. Both these types of process consist in making air pass over a column of adsorbents, for example of the zeolite type. Nitrogen is preferably fixed by the adsorbent and an oxygen-rich gas can thus be recovered at the column exit; it is then possible to regenerate the adsorbent by applying a slight reduced pressure in the column. Using a minimum of two columns in parallel with adsorption and desorption cycle phases, continuous delivery of an oxygenated gas rich in oxygen is possible.

Such plants deliver a sufficiently pure oxygenated gas, generally containing 90 to 98% oxygen, compatible with most conventional applications in industry, in particular with most conventional applications in the papermaking industry. A number of processes require only a few adjustments or modifications, especially a simple increase in the gas flow rate, when this type of oxygenated gas is used; the presence of gaseous impurities, particularly nitrogen and argon (inert non-oxidizing gases) does not in fact disturb these processes.

However, this does not necessarily apply in oxidation processes whose operating principle relies on an almost complete consumption of the oxidation gas fed into a reactor working at constant pressure and in which processes the presence of inert gases reduces the oxygen partial pressure in the gas in proportions which depend on the percentage of the said inert gases, also called inert components, in the gas used to carry out the oxidation. This reduction in the oxygen partial pressure impairs the progress of the reaction and makes it necessary to purge the gas overhead. The term "gas overhead" is used both to denote the space lying above the liquid phase in the reactor and to denote the gas contained in this space (the context will allow a person skilled in the art to know without any ambiguity the meaning to ascribe to this term when the distinction proves necessary). When the oxidation gas is pure oxygen, it is possible to maintain this partial pressure and therefore to carry out the oxidation of the substance to be oxidized, contained in the liquid phase. When this gas is not pure oxygen, the same does not apply and the gas overhead becomes enriched with inert components, therefore reducing the oxidation rate.

In general, in the prior art, when an oxidation gas containing inert components is used to oxidize substances contained in a liquid medium by transferring this gas into the said medium, provision is made to purge the gas overhead.

Thus, a conventional stirred tank reactor (or STR) is described in the article by M. Lawrence and M. Litz in CEP, November 1985, pp. 36-39, entitled: "*A Novel Gas-Liquid Stirred Tank Reactor*"). Within such a stirred tank reactor, the gases are distributed generally by a pierced torus placed at the bottom of the reactor, below the mechanical stirrer, designed, in principle, to disperse the gas throughout the reaction mixture. This type of reactor, allowing high transfer coefficients and thus efficient gas-liquid mixing, provides a simple venting should a diluting gas be present.

Also known, from WO-A-99/04088, is a process for the oxidation of white or black liquors carried out under pressure, at high temperature, in a stirred tank reactor fitted with a multibladed stirrer allowing axial and radial gas/liquid mixing. Located downstream of the said reactor is a gas/liquid separator designed to separate the undissolved gases from the oxidized liquor.

Also known, from WO-A-96/13463, is a process for the oxidation of effluents in an unconventional reactor in the presence of a heterogeneous catalyst, which works in the gas phase provided above the liquid phase. The liquid is stirred by means of an external pump in a recirculation loop. An in-line mixer placed in the recirculation loop intimately mixes gas with the liquid phase. The gas phase is withdrawn via a line.

Moreover, reactors are known, from U.S. Pat. No. 4,328,175 and U.S. Pat. No. 4,454,077, which are equipped with downflow gas/liquid mixing means, consisting of a helical impeller which creates a vortex on the surface of the liquid phase. The gas is injected into the gas overhead in the reactor and, mixed with the liquid by the vortex effect, is entrained into the liquid phase. The pumping flow created by the impeller is used to disperse the gas/liquid mixture throughout the entire volume of the reactor. These reactors are fitted with purging means.

However, none of the processes of the prior art has proposed a method of purging specifically adapted to the oxidation process carried out. At the present time, no simple means is known for purging the gas overhead of a reactor in a controlled manner so as to guarantee the desired oxidation and oxygen-consumption performance throughout the process involved. Insufficient purging of the gas overhead, resulting in an excessive reduction in the oxygen partial pressure, runs the risk of slowing down, or even stopping, the oxidation reaction carried out; excessive purging of the gas overhead certainly removes a larger amount of inert gases, thus admittedly maintaining a certain oxidation, but it results in excessive oxygen consumption and consequently adversely affects the economics of the process.

SUMMARY

The present invention relates to an improvement to oxidation processes by oxygen transfer into a liquid medium in a pressurized reactor.

The invention is more particularly related to a process for oxidizing a liquid contained in a reactor having a closed volume by means of an oxidation gas comprising at least one means for feeding the gas into the reactor and at least one means for feeding the liquid into the reactor at least one means for withdrawing the liquid, at least one means for withdrawing the gas, in which process the liquid contains compounds to be oxidized and the oxidation gas contains oxygen, the liquid and the oxidation gas are fed into the reactor in amounts such that a gas overhead is formed above the liquid contained in the reactor, a purge of the gas overhead is carried out.

The invention applies most particularly to processes involving a transfer of oxygen into a liquid medium for the purpose of oxidizing organic and/or inorganic compounds dissolved and/or suspended and/or dispersed in this liquid medium.

Mention may be made in particular of:
  wet oxidation processes used in particular in the environment, especially to oxidize the sulphides contained in industrial effluents and to treat, for example, spent refinery sodas;
  processes for the partial or total oxidation of papermaking liquors;
  oxidation processes used in the hydrometallurgy field, for example metal sulphide oxidation processes;
  chemical synthesis processes involving at least one oxidation step.

They may also be processes for oxidizing mineral substances for example ferrous salts (sulphates or chlorides) into ferric salts especially for the preparation of flocculating agents, or for the oxidation of various organic compounds.

The process of the invention solves, in a particularly advantageous manner, the problem of maintaining the oxygen content in the gas overhead in a reactor operating under pressure, by continuously purging the said gas overhead at a variable controlled flow rate.

The invention especially provides a particularly simple method of controlling and adjusting the purge flow rate in a reactor operating at constant pressure.

The invention applies to all cases in which the oxidation reaction is carried out using an oxidation gas containing, apart from oxygen, which is the oxidizing gas, gases which are inert with respect to the oxidation reaction. Such an oxidation gas—which will be called either oxidation gas or oxygenated gas—may include variable proportions of oxygen and of inert gases, in particular oxygen proportions possibly ranging from 20 to 99%.

Thus, the invention provides, in the case of the use of an oxygenated gas for the oxidation in a closed reactor of compounds contained in a liquid medium by transferring this gas into the liquid medium, a process using a particularly suitable method of purging the gas overhead; it also applies to processes in which the feeding of the oxygenated gas into the reactor is controlled by a pressure regulator.

In such processes, in which the oxidation is carried out by pure oxygen, the oxygen feed, carried out automatically, depends only the consumption of oxygen, that is to say on the progress of the reaction, which depends on the kinetic characteristics of the system. The oxygen fed in corresponds only to the oxygen consumed, in strict compliance with the stoichiometry of the reaction.

When pure oxygen is replaced with an oxygenated gas, it becomes necessary, as mentioned above, to purge the inert gases; obviously the ideal would be to remove only the amount of inert gases present in the reactor with the oxygen but it will be readily understood that, whatever the type of reactor and, in particular, in a perfectly stirred reactor provided with gas recirculation, some of the oxidizing gas, in this case, oxygen, will be removed with the inert gases.

It is an objective of the present invention to minimize the oxygen losses during the process.

It is another objective of the present invention to allow the reaction employed to run uninterruptedly.

For a number of oxidation reactions, the oxygen partial pressure in the gas overhead has a direct and/or indirect influence on the progress of the reaction. In particular, the partial pressure has a direct influence on the progress of the reactions for which gas-liquid transfer plays an essential role in the execution of the reaction.

Moreover, the oxygen partial pressure has an indirect influence in the case, for example, of exothermic reactions for which an increase in oxygen transfer allows the energy of the reaction to be released in a shorter time, thereby making it possible to work at higher temperature without external energy supply.

The invention thus consists in continuously purging the gas overhead at a variable controlled rate so as to maintain a predetermined oxygen partial pressure in the said gas overhead, the value of the partial pressure being predetermined so that it results in the oxidation rate which it is desired to obtain under the conditions of the process.

This is because, depending on the type of compound to be oxidized, depending on the operating conditions, and in particular depending on the partial pressure of the oxidizing gas, it is possible to influence the execution of the reaction, and especially the percentage of compounds that have reacted and the degree of oxidation of the oxidized compounds obtained. This aspect of the process of the invention will be illustrated in greater detail in the description which follows, especially by means of examples of how to implement the invention. By way of illustration in the case of sulphur compounds, we will consider the various attainable rates of conversion of sulphides, especially into sulphates and thiosulphates.

Thus, within the context of the present invention, it has been demonstrated that it is possible to manage the rate of purging of the gas contained in the gas overhead so as to have a predetermined oxygen partial pressure in the said gas corresponding to the degree of oxidation that it is desired to obtain under the conditions of the process.

More specifically, according to one of its essential characteristics, the invention is characterized in that the purging of the gas overhead ensures that there is a predetermined oxygen partial pressure in the gas overhead, the value of this partial pressure corresponding to the desired rate of oxidation of the said compounds.

Preferably, the oxidation gas is fed continuously into the reactor, the feed rate of the said gas being managed in such a way that the gas pressure in the overhead of the reactor is approximately constant. Thus, the invention therefore applies to all oxidation processes using transfer of an oxygenated gas in a reactor operating at constant pressure.

As explained above, the oxygen partial pressure in the overhead of the reactor has a direct or indirect influence on the progress of the reaction. Since the oxidation gas feed is controlled in such a way that the pressure in the gas overhead is kept constant, the invention provides various means for maintaining a predetermined oxygen partial pressure corresponding to the desired rate of oxidation of the substances under the conditions of the process.

This is because, for the same pressure in the reactor, the presence of a concentration of inert gases in the gas used to carry out the oxidation modifies the partial pressure of the oxygen available in the gas overhead. In the best case, this pressure may be equal to the oxygen partial pressure in the gas fed into the reactor reduced by the steam pressure at the reaction temperature. Nevertheless, keeping the oxygen partial pressure at a constant value requires a purge to be carried out.

For a defined reactor and for defined process conditions, the partial pressure of available oxygen depends on the imposed purge rate in the overhead of the reactor.

A good understanding of the reaction or reactions involved in the process makes it possible to define the oxygen partial pressure needed to carry out the process.

For a given reactor having given transfer characteristics and for a defined reaction, a suitable purge rate allows the desired oxygen partial pressure in the gas overhead of the reactor to be established.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
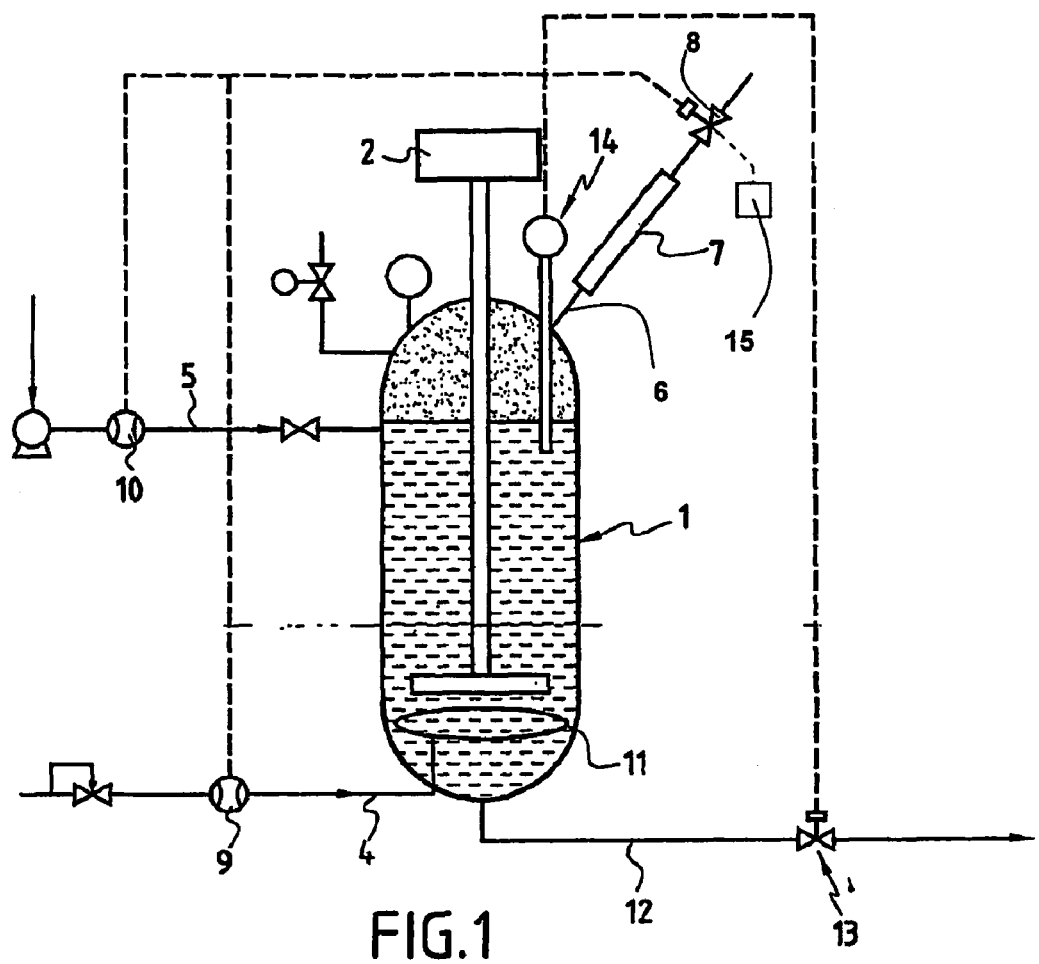
FIG. 1 illustrates one embodiment, according to the present invention, of a process for transferring a gas to a liquid with a self priming impeller.

As will become apparent from the explanation below, the invention provides two essential variants for maintaining a predetermined oxygen partial pressure in the gas overhead corresponding to the desired rate of oxidation of the compounds to be oxidized under the conditions of the process.

A first variant consists in controlling the purge rate so that it represents a predetermined fraction of the flow rate of the oxidation gas entering the reactor.

According to this first variant, for a given reactor, for given pressure and temperature conditions and for a given residence time of the liquid in the reactor, the purge rate is slaved to a measurement of the feed rate of the oxidation gas so that the purge rate represents a predetermined fraction k of the said feed rate of the oxidation gas into the reactor.

This is because when the reactor is made to operate in a constant-pressure mode, the feed gas rate (or incoming gas) is automatically adapted to the oxygen consumption, this being linked to the variations in the flow rate of the liquid and to the concentration of compounds to be oxidized which are contained in the said liquid—insofar as the amounts of gas fed in remain below the transfer capacity of the reactor.

However, the system may have to face variations in oxygen concentration in the incoming gas and/or variations in flow rate of the liquid containing the substances to be oxidized—a means for controlling the flow rate of the fluids entering the reactor is used to ensure that the ratio of the rate of feed of the gas and of the liquid remain approximately constant so as to ensure that the process is carried out properly.

This is because, for a given reaction, the ratios of the flow rates of the oxidation gas and of the liquid entering the reactor must remain between defined values. Consequently, comparing the incoming liquid and oxidation gas flow rates makes it possible to check this ratio and, if necessary, to apply a correction to the purge rate, for example by opening the purge valve to a greater extent for a defined time.

Within the context of this first variant, k, which is equal to the ratio of the purge rate to the flow rate of the oxidation gas entering the reactor (k is also called the degree of purge), may be determined either by calculation, if all the kinetic parameters of the reactions and the transfer coefficient of the reactor are known, or experimentally.

More specifically, according to one particular method of implementation, k is experimentally predetermined by imposing defined and stable operating conditions on the operation of the reactor. In general, the operating conditions are defined, for a given reactor, a given temperature, a given residence time, a given liquid composition to be oxidized, a given oxygen concentration in the oxidation gas and a given operating pressure, by ensuring that the flow rate of oxidation gas entering the reactor must always be less than the flow rate of gas that can be transferred by the said reactor. However, it should be noted that although this condition is essential for determining k by calculation, it is, however, less so for determining it experimentally. This is because the value found experimentally can always be used if one does not depart from the operating conditions under which it was found.

The experimental predetermination of k may especially be carried out in the following manner:

Two flowmeters are installed, the first allowing the oxidation gas flow rate ($Q_{feed}$) to be measured and the second allowing the purge gas flow rate ($Q_{purge}$) to be measured;

Having established the oxidation treatment conditions, the oxidation reaction is carried out with a purge flow rate at least equal to the flow rate of the inert gases entering the reactor, increased by a small percentage of oxygen (calculated dry-gas value). In general, this small percentage represents at least about 5% of the oxygen feed rate, in order not to block the system.

Having established the conditions, the oxygen concentration in the purge gas is measured, the measure being done on the cooled and dry gas.

Knowing the temperature in the reactor, and therefore the water partial pressure, and knowing the pressure in the reactor and the oxygen and inert-gas contents of the purge gas, it is possible to determine the oxygen partial pressure in the reactor.

This pressure ($P_{O_2}$) is equal to the concentration of oxygen in the purge multiplied by the pressure in the reactor.

Depending on the desired oxygen partial pressure, the purge valve is increased or decreased, i.e., consequently, the degree of purge k, which is equal to the ratio of the purge flow rate ($Q_{purge}$) to the oxidation gas feed flow rate ($Q_{feed}$), i.e.:

$$Q \times_{purge} = Q_{feed} \times k \text{ (read: purge flow rate=oxidation gas feed flow rate multiplied by the degree of purge).}$$

Still within the context of the first variant of the invention, according to another method of implementation, k may be predetermined by calculation based on the transfer capacity of the reactor and on the said desired oxygen partial pressure in the overhead of the said reactor, corresponding to the desired degree of oxidation of the compounds to be oxidized.

As will become apparent from the explanation which follows, this method of implementation is easy to employ.

It is necessary to know the transfer capacity of the reactor, which capacity is measured according to the standard conditions known to those skilled in the art. The transfer capacity may be expressed in moles of gas transferred per liter of reaction volume and per second (mol/l/s).

Corresponding to the defined oxygen partial pressure $P_{O_2}$ desired in the reactor is an oxygen and inert-gas concentration in the purge gas.

The oxygen partial pressure defined is directly proportional to the oxygen concentration in the purge gas.

The oxygen concentration is given, for a dry gas, (having ignored the steam pressure in the measurement).

k is equal to the ratio: purge flow rate/oxidation gas feed flow rate $k = Q_{purge}/Q_{feed}$/ k is also equal to the ratio: inert-gas concentration in the gas entering the reactor/inert-gas concentration in the purge gas (expressed in percent).

This is because, in order for the mass balance of the inert gases to be correct, it is necessary that:

$$Q_{purge} \times \% \text{ inert components in the purge} = Q_{feed} \times \% \text{ inert components in the incoming gas.}$$

From this it may be concluded that:

$$k = \% \text{ inert components in the incoming gas}/\% \text{ inert components in the purge.}$$

The results are, of course, valid only for values of k less than or equal to 1.

The purge flow rate is therefore:

$$Q_{purge} = k \times Q_{feed}$$

$$Q_{purge} = (\% \text{ inert components in the incoming gas}/\% \text{ inert compounds in the purge}) \times Q_{feed}$$

Moreover, denoting the nominal oxidation gas volume needed to obtain a certain desired degree of oxidation of one liter of liquid by V and denoting the feed flow rate of this liquid by $Q_{liquid}$, then $$Q_{feed} = V \times Q_{liquid}$$

It will therefore be understood that the purge system may be managed by maintaining the value k at the value predetermined by calculation or predetermined experimentally, as explained above, but, in addition, it will be advantageous to monitor the $Q_{feed}/Q_{liquid}$ ratio and to vary the purge flow rate as soon as this ratio departs from the values used for predetermining the value of k.

Thus, and again according to this first variant of the process, advantageously, the purge flow rate is temporarily modified when the ratio of the flow rate of the oxidation gas fed in to the flow rate of the liquid fed into the reactor lies outside a predetermined range flanking the value of the ratio of the oxidation gas and liquid feed flow rates used for determining the value of k.

According to a second variant of the process according to the invention, especially also allowing a constant oxygen partial pressure to be maintained in the gas contained in the overhead, the purge flow rate is slaved to a measurement of the oxygen concentration in the gas overhead so as to obtain the said oxygen partial pressure in the gas overhead corresponding to the desired degree of oxidation of the said compounds to be oxidized under the conditions of the said process.

In order to implement this variant, the oxygen concentration in the gas overhead of the reactor or, equivalently in the purge gas is permanently analysed. This analysis, coupled to the measurement of the pressure in the reactor and of the temperature, makes it possible to know the oxygen partial pressure in the reactor. It then suffices to control the purge valve in order to maintain the oxygen partial pressure in the reactor within the desired range. The system responds perfectly to the variations in oxygenated gas and liquid feed flow rates and to the variations in oxygen concentration in the overhead of the reactor.

This method requires the installation of an analysis system with an oxygen analyser tailored to the reactions involved.

Such an analysis system intended to implement this second method may include, not exhaustively, all or some of the following elements:

a purge gas sampling line comprising a device for monitoring the flow rate, for example a simple ball flowmeter;
a cooling system allowing the sampled gas to be cooled and the water vapour that it contains to be condensed;
a filter;
an oxygen analyser;
a periodic calibrating system.

In general, the process in the two variants as defined above may apply to all processes for the oxidation of substances dissolved, suspended or dispersed in a liquid medium by transfer into the said liquid medium of an oxygenated gas used in a reactor working at constant pressure.

The process of the invention applies advantageously in cases for which the pressure in the reactor is between 1.5 and 300 bar absolute, preferably between 3 and 100 bar.

The process according to the invention applies advantageously in cases in which the temperature at which the oxidation reaction is carried out lies within a wide range, in particular between −50 and 300° C., preferably between 20 and 150° C.

It should also be noted that the composition of the oxygenated gas entering the reactor may vary, again within very wide ranges.

This is because, although the process applies particularly well to cases in which a gas coming from a VSA or PSA type process, that is to say a gas generally containing from 90 to 98% oxygen, is used as oxygenated gas, it also applies to cases in which an oxygenated gas having appreciably lower oxygen contents is used. The process also applies to cases in which the oxygenated gas is a gas called off-gas recovered after an ozonization step.

Thus, the process of the invention advantageously applies when the oxidation gas fed into the reactor contains from 20 to 99% oxygen, preferably from 50 to 98% oxygen and even more preferably from 80 to 98% oxygen. The oxygenated gas injected into the reactor more preferably contains from 90 to 98% oxygen. The rest of the gas consists of gases which are inert with respect to the oxidation reaction, particularly nitrogen or argon.

The process of the invention may be used in any type of reactor capable of working at constant pressure.

Preferably, the reactor is provided with means allowing the gas to be transferred into the liquid.

Two types of device are particularly advantageous for implementing the process of the invention. Thus, advantageously, the process of the invention is characterized in that the gas is transferred into the liquid by a self-priming impeller, as shown in the diagram in FIG. 1. According to another method of implementation, the process of the invention is characterized in that the reactor is provided with a liquid recirculation loop which includes a hydro-ejector, ensuring that the gas is transferred into the liquid. A device for implementing this variant is shown in the diagram in FIG. 2.

More specifically, FIG. 1 shows a reactor 1 provided with a stirring device 2 and conventional heating or cooling means (not shown).

The oxygenated gas enters the reactor via the line 4 and an injection torus 11 placed beneath the impeller as indicated in FIG. 1. Another possibility would consist in feeding the gas into the gas overhead. The liquid containing the substances to be oxidized enters the reactor via the line 5. The line 6 is used to purge the gas overhead. This line is provided with cooling means 7, this cooling being provided, for example, by circulating water. The valve 8 is used to adjust the purge flow rate. The opening of this valve is slaved both to the measurement of the feed flow rate of the oxygenated gas, measured by the flowmeter 9 placed in the line 4 and the measurement of the feed flow rate of the liquid medium containing the substances to be oxidized, measured by the flowmeter 10 placed in the line 5. As a variant of the system, a constant oxygen partial pressure may also be maintained in the gas contained in the overhead by slaving the purge flow rate to a measurement of the oxygen concentration in the gas overhead performed by overhead gas oxygen concentration measurement device 15 so as to obtain the said oxygen partial pressure in the gas overhead corresponding to the desired degree of oxidation of the said compounds to be oxidized under the conditions of the said process.

The oxygenated gas enters the reactor via the line 4 and an injection torus 11 placed beneath the impeller as indicated in FIG. 1. Another possibility would consist in feeding the gas into the gas overhead. The liquid containing the substances to be oxidized enters the reactor via the line 5. The line 6 is used to purge the gas overhead. This line is provided with cooling means 7, this cooling being provided, for example, by circulating water. The valve 8 is used to adjust the purge flow rate. The opening of this valve is slaved both to the measurement of the feed flow rate of the oxygenated gas, measured by the flowmeter 9 placed in the line 4 and the measurement of the feed flow rate of the liquid medium containing the substances to be oxidized, measured by the flowmeter 10 placed in the line 5.

The oxidized liquid leaves via the line 12. Its flow rate is controlled by the valve 13, the opening of which is regulated by means of a level sensor 14.

The various control loops are portrayed by dotted lines in FIG. 1.

Figure 2:
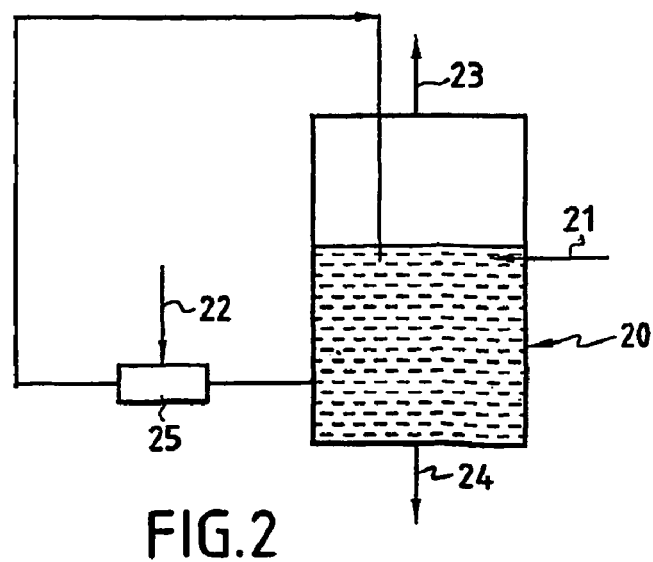
FIG. 2 illustrates one embodiment, according to the present invention, of a process for transferring a gas to a liquid with a liquid recirculation loop and a hydro-ejector.

FIG. 2 shows another device that can be used for implementing the invention.

In the device shown schematically in FIG. 2, a recirculation loop provided with a hydro-ejector 25 and with a pump (not shown) makes it possible to circulate the liquid during the oxidation step.

The liquid is fed into the reactor 20 via the line 21. The oxygenated gas enters the reactor via the line 22. In FIG. 2, the oxygenated gas is fed directly into the recirculation loop, at the hydro-ejector, this constituting an advantageous method of implementation. However, it would also be possible to feed the oxygenated gas into the gas overhead of the reactor at the hydro-ejector. The purge may be made via the line 23. The oxidized liquid is withdrawn via the line 24.

The recirculation loop allows the liquid to be stirred by means of the hydro-ejector. The loop allows the gas to be recycled and ensures that the gas is transferred into the liquid.

In this device, as in the previous device, the purge will be carried out by slaving the purge gas output valve to a measurement of the feed flow rate of the oxygenated gas and the feed flow rate of the liquid medium containing the substances to be oxidized.

The process of the invention is applicable to any liquid medium containing substances to be oxidized which are dissolved, suspended or dispersed in this medium.

It applies to all oxidation reactions involving an oxygenated gas transferred into a liquid medium within a reactor. In particular, mention may be made of:

wet oxidation processes used in particular in the environment, for example for oxidizing spent refinery streams;
oxidation processes in hydrometallurgy, for example for oxidizing metal sulphides;
oxidation processes used in particular in chemical synthesis. These may be both for the oxidation of mineral substances, for example the oxidation of ferrous sulphate or chloride into the corresponding ferric salt for the preparation of flocculating agents, and the oxidation of various organic compounds.

The process of the invention is particularly well suited to the oxidation of papermaking liquors. It is this type of reaction which is presented in the example which follows, given purely by way of illustration and implying no limitation of the invention.

EXAMPLE

Oxidation of Sulphides Contained in a White Papermaking Liquor

1—Principle of the Process a) Determination of $V_0$, the Volume of Oxygenated Gas (Oxidation Gas) Needed for the Oxidation Reaction (in the Absence of Purging).

The volume $V_0$ of oxygenated gas needed to achieve the desired degree of oxidation in the case of the example treated here is expressed per liter of liquor and may be determined in the following manner:

$$V_0 = (c/M) \times 22.4 \times y \times x$$

c: sulphide concentration in the liquor in g/l,
M: molar mass of sulphur
Y: 1+concentration of inert components ($N_2$, Ar) in the incoming oxygenated gas;
x: 1+desired degree of conversion into sulphate in the oxidized liquor.

b) Experimental Determination of the Degree of Purge k.

For various oxygen partial pressures and for the reactor used, the various degrees of conversion of the sulphides into thiosulphate and sulphate were determined experimentally.

Also experimentally, the degree of purge needed for a desired oxygen partial pressure, k, which represents a certain percentage of the flow rate of gas entering the reactor, was determined; this percentage k, as indicated above in the description, may be determined experimentally or calculated.

The volume of gas needed per liter of liquor is therefore equal to:

$$V = V_0 + V_0 \times k$$

c) Management of the Process

As described above, monitoring the ratio of the oxygenated gas feed flow rate to the liquor medium feed flow rate allows the process to be operated properly. Corrective actions on the purge may be made should there be a drift from the defined value.

2—Application to the Case of the Oxidation of a White Liquor Using a Gas Coming from a VSA Unit Containing 7% of Inert Components.

2. Determination of $V_0$.

For an oxygenated gas containing 7% of inert gas components, an initial sulphide concentration of 20 g/l, a desired sulphate content in the oxidized liquor of 80% (degree of conversion), an oxygen partial pressure of 5.3 bar (determined experimentally) and a total pressure of 10 bar, the following parameters may be given:

c=20
m=32
y=1+0.07=1.07 (7% of inert components in the feed gas)
x=1+0.8=1.8 (for 80% sulphate).

That is, an oxygenated gas consumption of:

$$V_{O_{gas}} = (20/32) \times 22.4 \times 1.07 \times 1.8 = 27.0 \text{ Sl per liter of 93\% oxygenated gas per liter of liquor.}$$

b) Determination of the Degree of Purge k.
In the present case, we have:
concentration of inert components in the feed gas=7%
oxygen partial pressure needed to obtain the desired conditions, equal to 5.3 bar;
reaction temperature of 100° C., i.e. 1 bar of steam pressure;
total pressure of 10 bar;
i.e. gas pressure in the reactor (=total pressure–steam pressure)=10–1=9 bar, hence:
oxygen concentration in the purge gas=(desired oxygen partial pressure $P_{O_2}$/pressure of the gases in the reactor)×100=(5.3/9)×100=58.9%, hence
% inert components (purge)=100–58.9=41.1%.
Under the above conditions, the factor k is therefore given by:

$$K = \% \text{ inert components (feed)}/\% \text{ inert components (purge)} = 7/41.1 = 0.17.$$

It therefore follows that, when applying the process of the invention, the purge flow rate will be adjusted in the present case to a value of 17% of the oxygenated gas feed flow rate so as to maintain the desired oxygen partial pressure in the reactor.

Moreover, the volume V of gas needed per liter of liquor is:

$$V = V_0 + V_0 k = 27 + 27 \times 0.17 = 31.6 \text{ Sl per liter of oxygenated gas.}$$

c) Control
The purge value is kept open in such a way that the purge flow rate is equal to 17% of the gas feed flow rate and so that the ratio of the gas feed flow rate to the liquid flow rate is equal to the value V determined above (31.6) to within 5%.

Should this value change by more than 5%, the following corrective actions may, for example, be applied:
a reduction in the value by more than 5% means that the purge valve is opened to 50% of its maximum opening for 1 minute;
an increase in the value by more than 5% means that the purge valve is closed for 5 seconds.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for oxidizing a liquid with an oxidation gas in a closed volume reactor, said method comprising:
  a) feeding a feed liquid into a reactor, wherein:
    1) said liquid is fed into said reactor by at least one liquid feeding device; and
    2) said liquid comprises compounds to be oxidized;
  b) feeding a feed gas into said reactor, wherein:
    1) said feed gas is fed into said reactor by at least one gas feeding device;
    2) said feed gas is an oxidation gas comprising oxygen; and
    3) said feed gas forms a gas overhead above said liquid as it is fed into said reactor;
  c) measuring an oxygen concentration in said overhead gas to provide a measured oxygen concentration;
  d) purging said gas overhead from said reactor at a purge flow rate;
  e) providing at least one liquid withdrawing device;
  f) providing at least one gas withdrawing device;
  g) selecting a desired degree of oxidation of said compounds to be achieved by performance of said method; and
  h) selecting a desired oxygen partial pressure of said overhead gas, said selected oxygen partial pressure being based upon said desired degree of oxidation, wherein the purge flow rate is slaved to said measured oxygen concentration such that as the measured oxygen concentration changes the purge flow rate is adjusted in order to obtain said desired oxygen partial pressure.

2. The method according to claim 1, wherein said feed gas is continuously fed into the reactor.

3. The method according to claim 1, wherein a feed rate of said feed gas remains about constant.

4. The method according to claim 1, wherein the pressure of said overhead gas is between about 1.5 bar absolute to about 300 bar absolute.

5. The method according to claim 4, wherein said pressure of said overhead gas is between about 3 bar absolute to about 100 bar absolute.

6. The method according to claim 1, wherein temperature of said process is about −50° C. to about 310° C.

7. The method according to claim 6, wherein temperature of said process is about 20° C. to about 150° C.

8. The method according to claim 1, wherein said gas fed into the reactor comprises from about 20% to about 99% oxygen.

9. The method according to claim 8, wherein said gas fed into the reactor comprises from about 50% to about 98% oxygen.

10. The method according to claim 9, wherein said gas fed into the reactor comprises from about 80% to about 98% oxygen.

11. The method according to claim 10, wherein said gas fed into the reactor comprises from about 90% to about 98% oxygen.

12. The method according to claim 1, wherein said reactor contains a stirring device allowing the gas to be transferred into the liquid contained in the reactor.

13. The method according to claim 12, wherein said stirring device comprises a self-priming impeller.

14. The method according to claim 1, wherein said process may be employed for at least one of the reactions selected from the group consisting of: partial and/or total oxidation for papermaking liquors, oxidation processes for the hydrometallurgy field, chemical synthesis processes involving at least one oxidation step, and wet oxidation processes.

* * * * *